Nov. 30, 1965  H. D. KELLEY  3,220,538
MOUNTING FOR BELT-TROUGHING IDLERS
Filed June 9, 1964
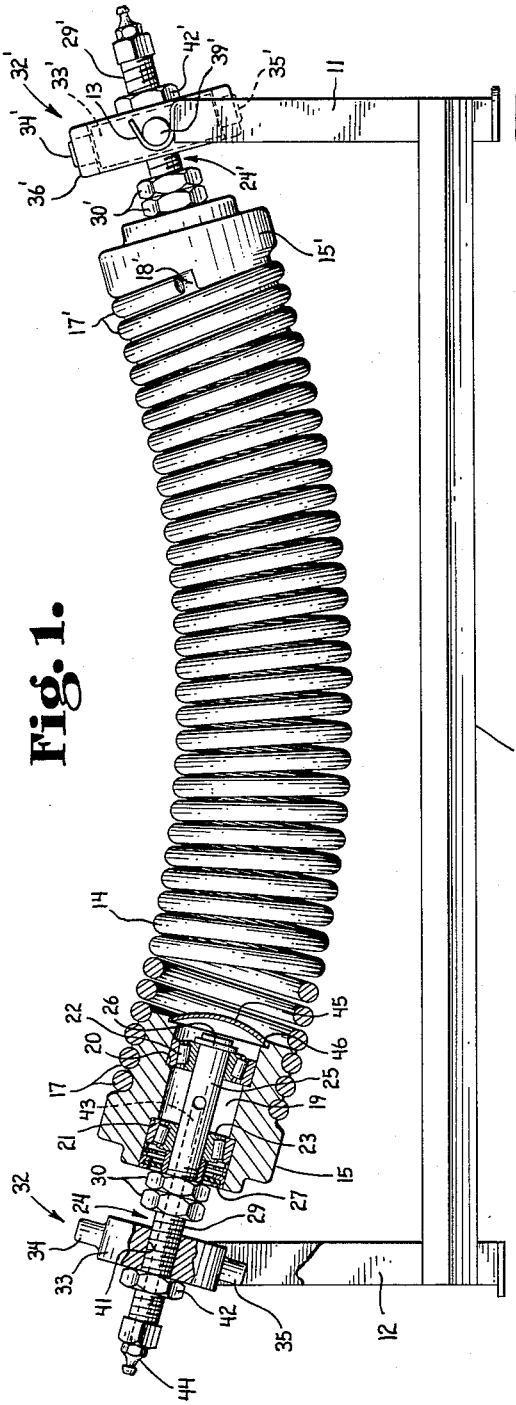
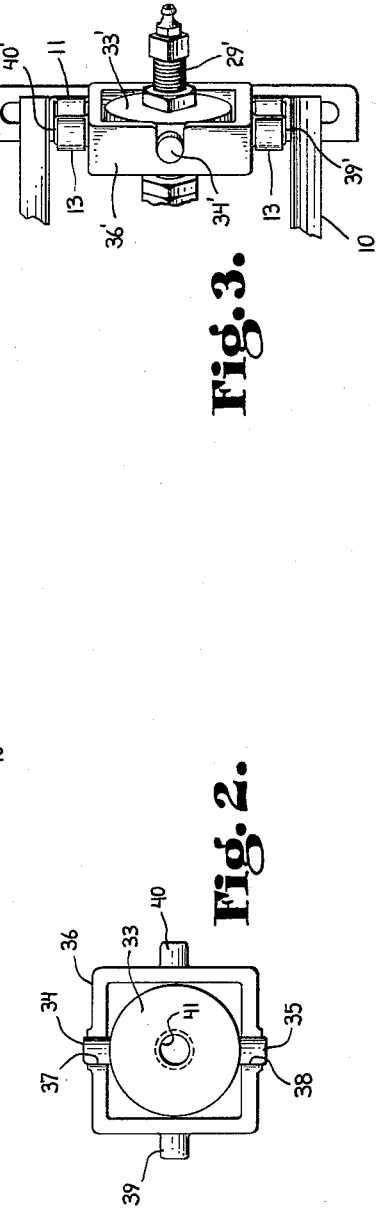
INVENTOR.
HUGH D. KELLEY
BY
Hood, Gust & Irish
Attorneys

United States Patent Office 3,220,538
Patented Nov. 30, 1965

3,220,538
MOUNTING FOR BELT-TROUGHING IDLERS
Hugh D. Kelley, Enterprise, Kans., assignor to The J. B. Ehrsam & Sons Manufacturing Company, Enterprise, Kans., a corporation of Kansas
Filed June 9, 1964, Ser. No. 373,732
6 Claims. (Cl. 198—192)

The present invention relates to belt-troughing idler rollers and means for mounting the same to support the load-bearing run of a conveyor belt. The primary object of the invention is to provide such a structure in which the roller is supported at each end for limited universal movement relative to a fixed support. A further object of the invention is to provide such a structure in which at least one end of the roller is axially adjustable toward and away from its support for the purpose of modifying the radius of the curve assumed by the roller.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

FIG. 1 is a fragmentary elevation of a roller structure constructed in accordance with the present invention and supported upon conventional frame or carrier members, portions of the roller assembly being illustrated in section;

FIG. 2 is an end elevation of a gimbal assembly which is included in the preferred embodiment of the present invention; and FIG. 3 is a fragmentary plan view showing the manner in which such a gimbal assembly is mounted, in normal use, upon conventional support means.

Referring more particularly to the drawings, it will be seen that I have illustrated a transverse member 10 to the opposite ends of which are fixed upstanding support posts 11 and 12. It is conventional in belt conveyors to provide a plurality of pairs of such posts arranged, at spaced intervals in the length of a conveyor, respectively adjacent the opposite lateral edges of the belt path, each pair of posts being connected by a transverse member such as the member 10. Each such support is provided adjacent its upper end with a pair of aligned, outwardly facing hooks 13 for engagement by hanger means associated with an end of an idler roller; and suitable means (not shown) is provided for supporting the return run of a conveyor belt.

In the illustrated embodiment of my invention, each belt-troughing roller comprises a coiled spring 14 which, of course, is axially resilient and transaxially flexible. At each end of each such spring there is provided a hub 15 or 15′, said hubs being suitably fixed to the respective ends of the roller 14. As shown, each hub is formed with an external, helical groove 16 proportioned and designed to receive one or more of the terminal convolutions 17 of the spring 14. Preferably, the hub is so proportioned that the effective diameter established by the base of the groove 16 is slightly greater than the equilibrium internal diameter of the spring 14. Thus, as the hub is entered in the spring end, by rotation, the convolutions 17 "threading" themselves into the groove 16, the spring end will be slightly expanded so that the spring will tightly, resiliently engage the hub to retain the hub in position and against rotational movement relative to the spring. Preferably, each groove 16 ends in a shoulder such as that indicated at 18′.

Each of the hubs is hollow, and the bore 19 thereof is formed to provide an annular shoulder 20 facing the proximal end of the hub and with a second annular shoulder 21 facing the distal end of the hub. An anti-friction bearing 22 is entered in the proximal end of the bore 19 and bears against the shoulder 20, while a second anti-friction bearing 23 is entered in the distal end of the hub and bears against the shoulder 21.

A spindle 24 has its proximal end region 25 received within the bore 19 and journalled in the bearings 22 and 23, a suitable stop means such as a snap ring 26 being mounted on the spindle end and cooperating with the bearing 22 to restrain the spindle against axial movement in one direction relative to the hub 15. A spacer 27 bears against the bearing 23, suitable packing means 28 is received in the distal end of the bore 19 beyond the bearing 23, and stop nuts 30 are threaded on the distal portion 29 of the spindle 24, bearing against the spacer 27 and the packing means 28 to retain the spindle 24 against axial movement in the opposite direction relative to the hub 15.

Hanger means for supporting the spindle 24 from the post 12 is indicated generally by the reference numeral 32. In the preferred embodiment of my invention, said hanger means comprises a gimbal assembly consisting of a first member 33 having trunnions 34 and 35 projecting diametrically oppositely from its periphery, and a second member 36 having outwardly opening slots 37 and 38 in which the trunnions 34 and 35 are respectively oscillably received. Trunnions 39 and 40 project oppositely from the member 36 upon a common axis perpendicular to the axis of the trunnions 34 and 35, and said trunnions 39 and 40 are oscillably receivable in the respective hooks 13 of the post 12.

The member 33 is formed with a threaded bore 41 whereby the gimbal assembly may be adjustably threadedly mounted on the threaded portion 29 of the spindle 24 with the axis of the trunnions 34 and 35 perpendicularly related to the axis of the spindle 24.

A jam nut 42 is mounted on the threaded portion 29 of the spindle 24 outside the gimbal assembly 32. Desirably, the spindle 24 will be formed with a bore 43 opening radially into the interior 19 of the hub 15 at a point between the bearings 22 and 23, and a lubricating fitting 44 will be carried at the distal extremity of the spindle.

As is indicated by primed reference numerals corresponding to those just described, the hub 15′ may be similarly supported from the hooks 13 at the upper end of the post 11.

It will be apparent that, because of the gimbal mounting of the spindles 24 and 24′, the spring 14 may be transaxially flexed in any direction without disturbing or straining the hanger arrangement at either end of the roller.

It will further be apparent that the spindles 24 and 24′ will not partake of the rotational movement of the roller 14. However, the curve assumed by the spring 14 between its hangers may be adjusted, without dismounting the roller assembly, by loosening the jam nut 42 or 42′ and rotating the spindle 24 and 24′ in one direction or the other, thus shifting the associated spindle to lengthen or shorten the distance between the hubs 15 and 15′. Thus the attitude of each roller in a conveyor system may be finely adjusted to the precise optimum curve for its particular position in the conveyor assembly. It is frequently deemed desirable to flatten the belt trough as the belt approaches the discharge end of its load-bearing run; and, through the means herein disclosed, it will be seen that such flattening can be accomplished in precisely the desired progression by separating the hubs 15 and 15′ of the idlers adjacent such discharge end to progressive and accurately predetermined degrees.

I claim as my invention:
1. For use in a belt conveyor structure including laterally-spaced pairs of support means, an idler structure comprising transaxially flexible, axially resilient roller means, hub means at each end of said roller means fixed to rotate with said roller means, a spindle for each hub means, anti-friction bearing means interposed between each spindle and its hub means, means securing each spindle against axial movement relative to its hub means, and a gimbal assembly for each spindle, each gimbal assembly comprising a first member secured to its spindle and a second member connected to said first member for relative oscillation about an axis transverse relative to the axis of its spindle, said second member being provided with trunnion means perpendicular to said axis of oscillation and transverse relative to said spindle axis, said trunnion means being oscillably engageable with one of such a pair of supports to suspend said idler structure.

2. For use in a belt conveyor structure including laterally-spaced pairs of support means, an idler structure comprising transaxially flexible, axially resilient roller means, hub means at each end of said roller means fixed to rotate with said roller means, a spindle for each hub means, anti-friction bearing means interposed between each spindle and its hub means, means securing each spindle against axial movement relative to its hub means, and a gimbal assembly for each spindle, each gimbal assembly comprising a first member threadedly mounted on its spindle for axial adjustment relative thereto, and a second member connected to said first member for relative oscillation about an axis transverse relative to the axis of its spindle, said second member being provided with trunnion means perpendicular to said axis of oscillation and transverse relative to said spindle axis, said trunnion means being oscillably engageable with one of such a pair of supports to suspend said idler structure.

3. An idler structure comprising transaxially flexible roller means, hub means at each end of said roller means fixed to rotate with said roller means, a spindle for each hub means, anti-friction bearing means interposed between each hub means and its spindle, means restraining relative axial movement between each hub means and its spindle, and a gimbal assembly for each spindle, each gimbal assembly comprising a first member secured to its spindle and a second member mounted on said first member for oscillation relative thereto about an axis transaxial relative to the axis of said spindle, said second member having trunnion means disposed on an axis transverse relative to said spindle axis and perpendicular to said axis of oscillation.

4. An idler structure comprising transaxially flexible roller means, hub means at each end of said roller means fixed to rotate with said roller means, a spindle for each hub means, anti-friction bearing means interposed between each hub means and its spindle, means restraining relative axial movement between each hub means and its spindle, and a gimbal assembly for each spindle, each gimbal assembly comprising a first member threadedly mounted on its spindle for axial adjustment relative thereto and a second member mounted on said first member for oscillation relative thereto about an axis transaxial relative to the axis of said spindle, and means for retaining said first member in any selected position of adjustment relative to said spindle, said second member having trunnion means disposed on an axis transverse relative to said spindle axis and perpendicular to said axis of oscillation.

5. An idler structure comprising a coiled spring, a hollow hub at each end of said spring received within and tightly gripped by the terminal convolutions of said spring, anti-friction bearing means axially fixed within each hub, a spindle for each hub having its proximal end region journalled in, and held against axial movement relative to, said bearing means, and a gimbal assembly for each spindle, each gimbal assembly comprising a first member mounted on the distal region of its spindle and a second member mounted on said first member for oscillation relative thereto about an axis transverse relative to the axis of said spindle, said second member being provided with trunnion means disposed on an axis transverse relative to said spindle axis and perpendicular to said axis of oscillation.

6. The idler structure of claim 5 in which the distal region of at least one spindle is threaded and the first member of the gimbal assembly for said one spindle is threadedly mounted thereon for axial adjustment.

References Cited by the Examiner

UNITED STATES PATENTS

| | | | |
|---|---|---|---|
| 2,743,810 | 5/1956 | Armstrong | 198—192 |
| 2,757,988 | 8/1956 | Lecourbe | 198—192 X |
| 2,901,093 | 8/1959 | Harbottle. | |
| 3,070,219 | 12/1962 | Donadio | 198—192 |
| 3,166,184 | 1/1965 | Boyd | 198—192 |

SAMUEL F. COLEMAN, *Primary Examiner.*